INVENTORS
GERALD F. LEWIS
DAVID P. JONES

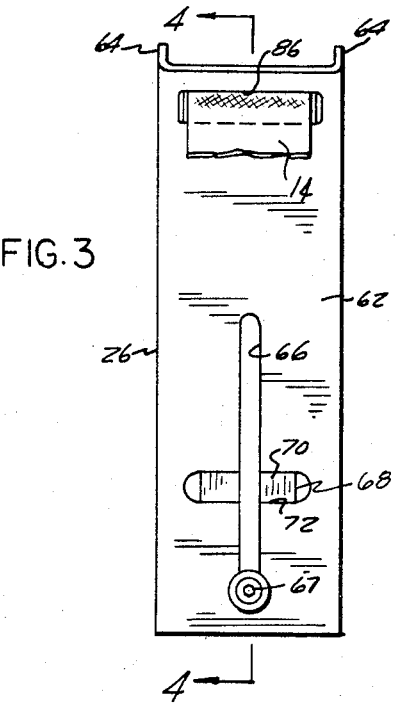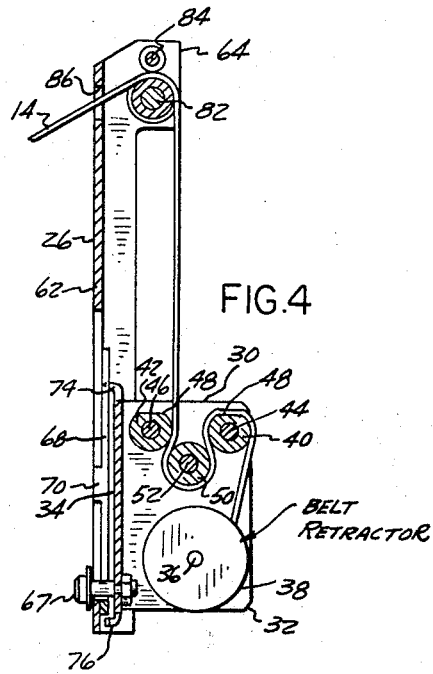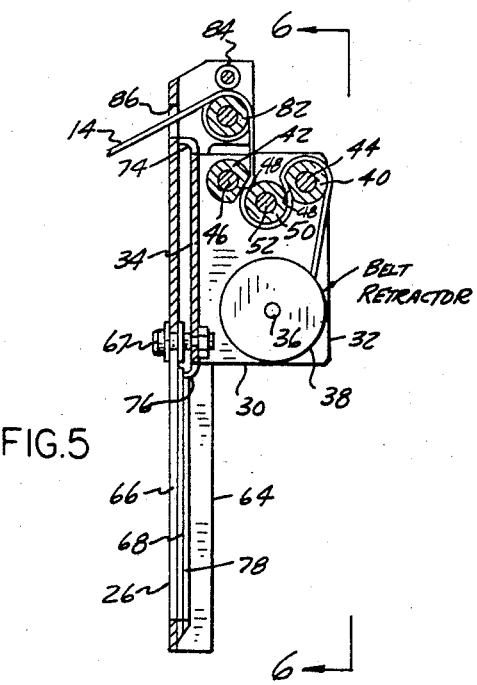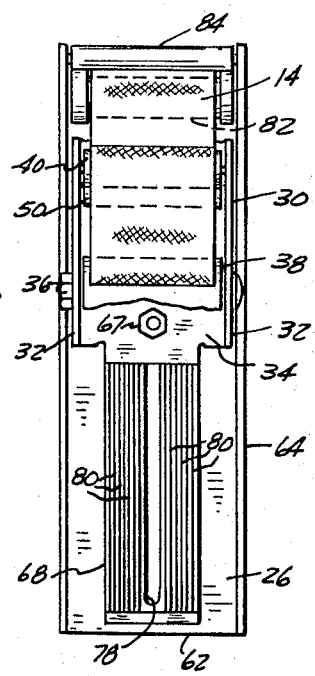

United States Patent Office 3,431,019
Patented Mar. 4, 1969

3,431,019
INERTIA RETRACTING DEVICE WITH ENERGY ABSORBING ELEMENT
Gerald F. Lewis, Berkley, and David P. Jones, Detroit, Mich., assignors to Jim Robbins Seat Belt Co., Royal Oak, Mich.
Filed Apr. 21, 1967, Ser. No. 632,646
U.S. Cl. 297—386          11 Claims
Int. Cl. B60r 21/10

ABSTRACT OF THE DISCLOSURE

An energy absorbing seat belt mounting device having a belt retracting unit permitting unrestrained feed-out of the extended occupant restraining portion of the belt from a stored position in response to normal movements of the occupant. The seat belt travels through a set of locking rollers which react to an excessive belt feed-out rate by clamping the belt to the retractor mounting member to prevent a further extension of the belt from the retracting unit. An excessive feed-out rate corresponds to a sudden belt extension caused by inertial forces tending to displace the occupant from his seat during a sudden deceleration of a vehicle.

The locking rollers and retracting unit are mounted on a yoke which is mounted to the vehicle for movement in a direction corresponding to the movement of the belt. A predetermined tensile force acting on the belt, with the locking rollers in a clamped condition, causes the yoke to move at a controlled rate as a set of teeth scrape a series of grooves in an expandible energy absorbing element. The groove scraping action absorbs the deceleration forces acting on the occupant through the belt.

BACKGROUND OF THE INVENTION

Field of the invention

This invention relates to vehicle safety seat belt devices and more particularly to an energy absorbing seat belt mounting which permits a controlled extension of the belt in the event of a sudden deceleration of the vehicle.

Description of the prior art

Occupant restraining systems are becoming increasingly employed in modern day vehicles to reduce the extent of the injuries incurred by an occupant caused by the vehicle experiencing a sudden deceleration as the result of a collision or the like. These injuries result from the weight of the unrestrained, seated occupant creating a momentum tending to displace him from his seated position toward contact with various non-yielding, injury-producing portions of the interior vehicle structure. Generally, such occupant restraining systems take the form of an arrangement of belts for encircling the torso of the occupant with the terminal ends of the belts secured to a relatively unyielding fixed part of the vehicle.

There are two major drawbacks associated with conventional seat belt mounting devices which manifest themselves in the general reluctance of the occupants to utilize the seat belt arrangement.

The first major drawback is that the conventional seat belt mounting device restrains the occupant so that he cannot perform normal body motions. In order to perform a movement requiring a relative displacement of his body with respect to the seat, he must either unfasten the coupled sections of the belt or loosen the belt so that he has sufficient freedom to perform these normal movements. Obviously, if the occupant unfastens the belt or loosens it sufficiently to perform these motions, the belt does not serve a restraining function in the event of a sudden collision.

The second major drawback to conventional seat mounting devices is that in the event of a collision or other occurrence producing a violent opposition to the movement of the vehicle, the vehicle and the seat belt simultaneously experience a sudden deceleration. However, the weight of the occupant restrained by the seat belt creates a momentum tending to displace the occupant in a path generally in the direction of the previous motion of the vehicle. This displacement is restrained by the seat belt arrangement so that the occupant remains in a generally restricted area.

However, the momentum created by his body weight and acting against the unyielding seat belt often produces serious internal injuries.

The preferred embodiment of the present invention obviates the aforementioned problems of conventional seat belt mounting devices by providing an improved mounting device arranged to permit the occupant to perform normal body movements and which in the event of an occurrence producing a force suddenly opposing the forward movement of the vehicle causes the occupant to experience a cushioned and limited displacement with respect to his seat.

SUMMARY

The preferred embodiment of the present invention, which will be subsequently described in greater detail, comprises a seat belt mounting device preferably associated with each of the secured ends of a seat belt restraining system. For purposes of description, the preferred embodiment is described with reference to a mounting device arranged in the back supporting portion of a conventional vehicle seat unit to control the extension and retraction of a belt section issuing over the shoulder of the occupant.

Preferably, the preferred embodiment comprises a slotted bracket affixed to the frame of the seat and a yoke connected to the bracket for limited movement in a direction corresponding to the movement of the belt. The yoke has a pair of spaced sidewalls supporting a rotary belt retracting device. The terminal end of the belt is secured to the belt retracting device so that the midportion of the belt is movable between a stored, wound-up position within the retractor housing and an extended operating position. The retractor produces a force on the belt tending to bias the belt toward its stored position but permitting the belt to be withdrawn therefrom in response to a pulling force. Thus, the occupant can freely move as he performs normal body movements, the belt extending and retracting to accommodate these movements.

The sidewalls of the yoke also support a set of locking rollers each supported on an axis transverse to the movement of the belt. The locking rollers include a pair of fixed, spaced apart rollers and a clamping roller supported for movement toward and away from engagement with the pair of rollers. The movable roller is spring-biased toward the disengaged position so that the belt which is wound between the pair of fixed rollers and around the clamping roller can freely travel in the direction of its length.

A predetermined tensile force acting on the belt to produce an excessive feed-out rate as the occupant is suddenly and violently displaced from his seated position causes the belt to displace the clamping roller toward an engaged position with the fixed rollers. That portion of the belt wound around the clamping roller is locked between the clamping roller and the fixed rollers so that further extension of the belt from the retracting device is prevented.

The tensile force acting on the belt is transmitted through the locked rollers to the yoke and tends to move the yoke with respect to its bracket. The bracket releasably supports a generally flat, expendible, energy absorbing element preferably of plastic, aluminum or other soft material.

The yoke carries a series of scraper teeth arranged for movement along an interference path with the expendible energy absorbing element. Thus, the yoke moves at a controlled rate in the direction corresponding to the movement of the belt and provides a limited extension of the belt. The movement of the yoke is controlled by the scraper teeth engaging the energy absorbing element and digging a series of elongated furrows or grooves in the element. The energy producing the force acting on the belt is absorbed as the scraper teeth abrade the surface of the element throughout the entire length of the travel of the yoke. The controlled travel of the yoke permits the extension of a limited segment of the belt so that the occupant experiences a cushioned displacement with respect to his seat. It is to be understood of course that this controlled displacement of the occupant is limited in length so that he does not come into contact with an injury producing portion of the vehicle.

It is therefore an object of the present invention to provide an energy absorbing seat belt mounting device permitting the occupant of the seat to perform normal movements and responding to a force tending to produce a sudden displacement of the occupant with respect to the seat by limiting the displacement to a controlled, cushioned movement.

It is another object of the present invention to provide an improved safety seat belt mounting device including a belt retracting unit normally biasing the belt toward a stored position but permitting the belt to extend in response to a normal pull-out force and including a set of lockable rollers mounted on the retracting mounting member and arranged to react to an excessive belt feed-out rate by clamping the belt to the mounting member to prevent further extension of the belt from the retracting device.

It is still a further object of the present invention to provide means for anchoring the end of a seat belt to a relatively fixed unyielding portion of the vehicle with means to absorb the energy producing a predetermined tensile force on the belt by providing a first member affixed to the vehicle and a second member inseparably connected to the first member and movable in a direction corresponding to the movement of the belt; means anchoring the end of the belt to the second member, and energy absorbing means restricting movement of the belt and second member with respect to the first member comprising an expendible energy absorbing element carried by the first member and a set of teeth carried by the second member, the set of teeth being movable along an interference path with the expendible element so that a predetermined force acting on the belt causes the teeth to scrape a series of grooves in the surface of the expendible element.

Still further objects and advantages of the present invention will readily occur to one skilled in the art to which the invention pertains upon reference to the following detailed description.

*Description of the drawings*

The description refers to the accompanying drawings in which like reference characters refer to like parts throughout the several views and in which:

FIG. 3 is an elevational view of the seat mounting device taken along lines 3—3 of FIG. 2;

FIG. 4 is a longitudinal, sectional view taken through the seat mounting device and along lines 4—4 of FIG. 3;

FIG. 5 is a sectional view similar to FIG. 4, but showing the yoke in its final position with respect to the bracket; and FIG. 6 is a view taken along lines 6—6 of FIG. 5.

*Description of the preferred embodiments*

Figure 1:
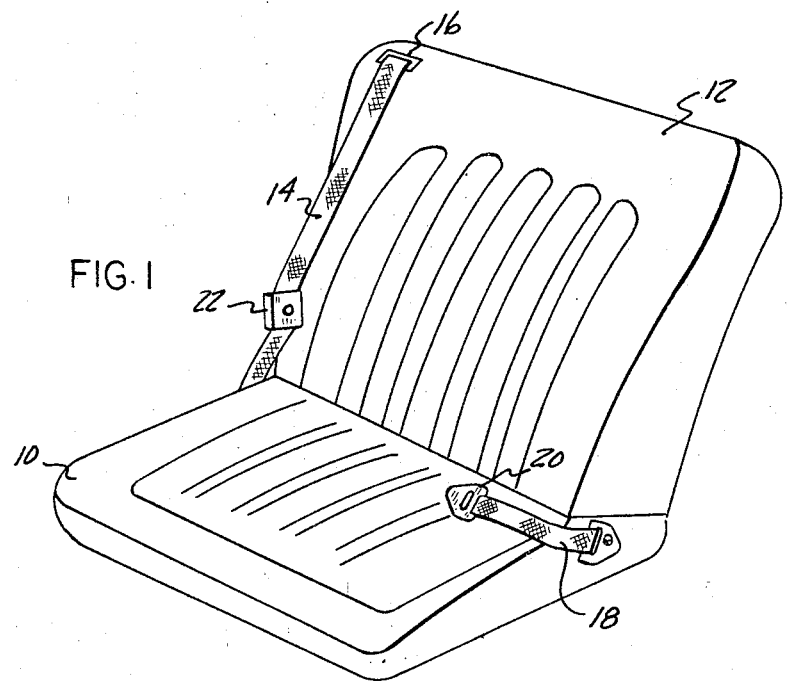
FIG. 1 is a view of a vehicle seating unit having a safety seat belt arrangement associated therewith.

Referring to the drawings, FIG. 1 illustrates a vehicle seat assembly as comprising a generally horizontal seat portion 10 and an upright back-supporting portion 12 mounted to a relatively fixed structural portion of a vehicle (not shown). It is to be understood of course that the upright back supporting portion 12 is normally non-pivotal with respect to the seat portion 10.

An occupant restraining system preferably comprises a continuous belt section 14 having its lower end anchored to the seat 10 and its upper end movable into and out of the upright back portion 12 through an opening 16. A second belt portion 18 has its lower end anchored to the frame of the seat 10 and carries a coupling section 20 engageable with a complementary coupling section 22 carried by the belt section 14.

Figure 2:
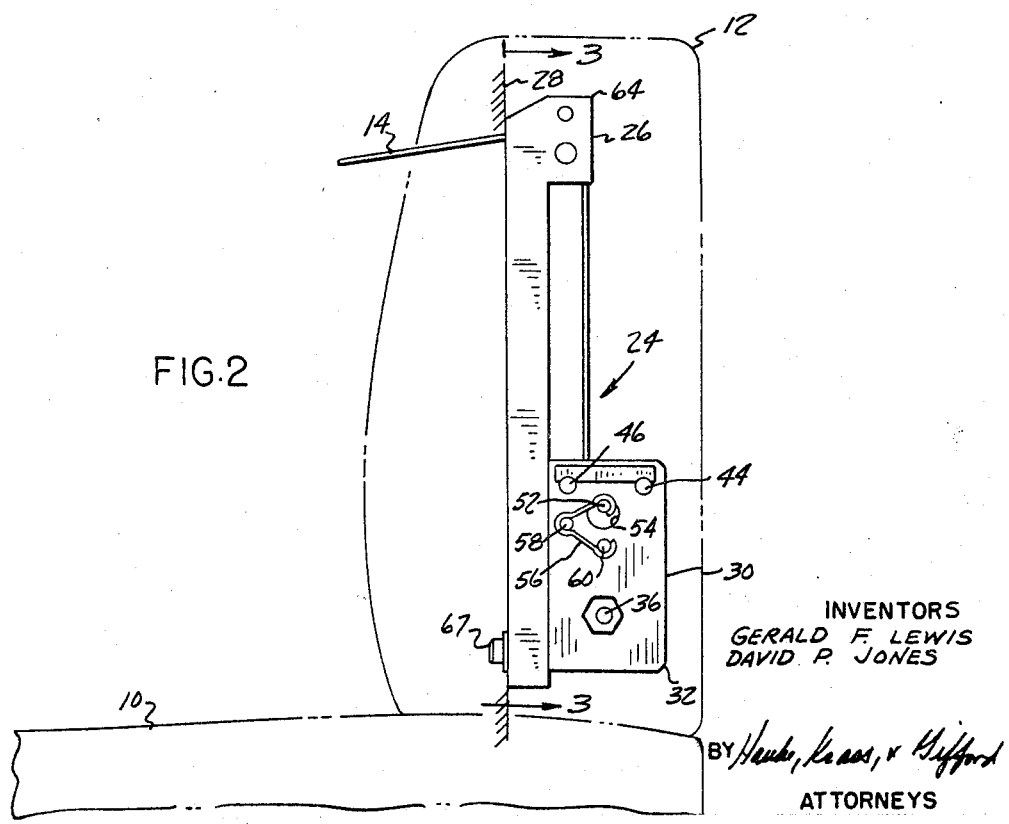
FIG. 2 is an elevational sectional view through the upright back-supporting portion of the seating unit illustrated in FIG. 1 and showing a seat belt mounting device illustrating the preferred embodiment of the present invention with the retractor mounting yoke in its initial position.

For purposes of description, the belt section 18 and the lower portion of the belt 14 are anchored to the seat 10 while the upper end of the belt 14 is attached to a seat mounting device 24 (FIG. 2). The seat mounting device 24 permits the extended portion of the belt 14 to vary in accordance with the physical dimensions of the occupant of the seat and to accommodate the movements of the occupant of the seat. It is obivous that a mounting device similar to seat mounting device 24 could be attached to the anchored lower end of the belt 18 as well as to the lower end of the belt 14 so that the configuration of the belt arrangement across the torso of the occupant remains fairly constant under all circumstances.

The seat belt mounting device 24 comprises a bracket 26 fixed to a suitable fixed frame portion 28 of the upright back portion 12 so that it is relatively immovable with respect to the vehicle associated with the seat. A yoke 30 is connected to the bracket 26 and is movable between a lower, normal position illustrated in FIG. 2 and a raised position illustrated in FIG. 5.

The belt 14 is connected to the yoke 30 so that in response to a predetermined pull-out force on the belt 14 the movement of the yoke 30 provides a controlled extension of the belt 14.

As can best be seen in FIGS. 2, 4 and 6 the yoke 30 has a pair of spaced apart parallel sidewalls 32 connected by a base portion 34. An anchor pin 36 is supported between the sidewalls along an axis generally transverse to the movement of the belt. The anchor pin 36 supports a rotary seat belt retractor 38. The seat belt retractor 38 comprises any conventional retracting device of the type wherein the secured end of the belt 14 is biased toward a wound-up stored position within the retractor housing. Preferably, the terminal end of the belt is looped around the anchor pin 36 with spring-biased means provided to produce a wind-up force on the belt 14 so that the belt 14 is normally retracted toward the wound-up position. The belt retractor 38 permits a variable length of the belt 14 to be withdrawn from within the retractor housing by a nominal pull-out force so that the occupant of the seat can perform normal body movements under substantially unrestrained conditions.

Spaced from the retracting device and in the direction of the pull-out force, the sidewalls 32 support a pair of spaced apart roller members 40 and 42. The roller members 40 and 42 have a length slightly greater than the width of the belt 14 and are supported for rotation about an axis transverse to the movement of the belt 14. The rollers 40 and 42 are supported by shafts 44 and 46 journaled in the sidewalls 32 and fixed against movement in a direction transverse to their axis of rotation. The circumference of each of the rollers 40 and 42 has a flat portion 48 extending the full length of the rollers.

A movable clamping roller 50 is laterally spaced from the plane defined by the axis of rotation of the rollers 40 and 42 and is movable toward and away from the rollers 40 and 42. The clamping roller 50 has a shaft 52 received in a pair of enlarged apertures 54 (only one of which is shown) provided in the sidewalls 32. The apertures 54 are illustrated as being circular in configuration, but they could as well be slots arranged to permit the movement of the clamping roller 50 between a lower position wherein it is spaced from the rollers 40 and 42 and a raised position wherein it is closely adjacent the rollers 40 and 42.

As can best be seen in FIG. 2, the roller 50 is normally biased toward the lowered position by a generally V-shaped spring member 56 supported on a pair of pins 58 and 60 extending laterally from the exterior side of the sidewalls 32. One arm of the spring 56 acts against the pin 60 while the other arm acts against the shaft 52 to bias the roller 50 toward the lowered position.

Still referring to FIGS. 2 and 4, the belt 14 extends from the retractor 38, is partially wrapped around the roller 40 to extend down between the fixed rollers 40 and 42 and is wrapped around the clamping roller 52. The spring 56 has a stiffness chosen so that the locking roller 52 is biased toward its lowered, disengaged position in response to normal tensile forces imposed by the occupant of the seat on the belt 14. However, in response to a force tending to produce an excessive pull-out rate on the belt 14 such as an inertial force tending to produce a sudden displacement between the occupant and the seat, the roller 50 moves upwardly against the bias of the spring 56 until the belt is clamped between the clamping roller 50 and the rollers 40 and 42. This upward clamped position of the roller 50 is best illustrated in FIG. 5.

Slippage between the belt 14 and the surfaces of the rollers 50, 40 and 42 is reduced by the flat portions 48 of the rollers producing a camming action tending to prevent the rollers 40 and 42 from further rotation once the flat portions 48 are engaged with the locking roller 50. Thus, in the upward clamped position of the roller 50, further extension of the belt 14 from the retractor is prevented and the force producing the clamped condition is transmitted to the sidewalls 30 of the yoke by the rollers.

Now, referring to FIGS. 3 and 4, the bracket 26 includes a base 62 and a pair of sidewalls 64 extending in a direction away from the base. The sidewalls 64 are spaced apart a sufficient distance to permit the yoke 30 to move from its lowered position to its raised position therebetween.

The base 62 of the bracket 26 has an elongated slot 66 midway between the sidewalls 64 and extending in a direction corresponding to the movement of the belt 14. A threaded fastener 67 connects the base 34 of the yoke to the bracket 26 and extends through the slot 66 so that the yoke 30 is securely connected to the bracket 26 but movable from its lowered position toward its upper position in a direction defined by the slot 66. It can be seen that the upper limit of the travel of the yoke 30 is defined by the threaded fastener 67 coming into abutment with the upper end of the slot 66.

Preferably, an elongated plastic energy absorbing plate 68 is carried at the lower portion of the base 62 of the bracket 26 and is locked against vertical movement by a raised portion 70 seated in a slot 72 of the base 62.

A series of scraper teeth 74 are carried at the upper end of the base 34 of the yoke and directed toward the energy absorbing plate 68. The teeth 74 extend preferably in a direction transverse to the relative movement between the yoke 30 and the bracket 26. Similarly, a second pair of scraper teeth 76 depend from the lower edge of the base 34 of the yoke directed toward the surface of the plate 68.

Referring to FIGS. 4 and 6, the yoke 30 is assembled with the bracket 26 so that the upper set of scraper teeth 74, drawn by the threaded fastener 67, bite into the surface of the plate 68. Similarly, the threaded fastener 67 is adjusted so that the lower set of teeth 76 are in abutment with a lowered tapered edge of the plate 68 with the fastener 67 registering in a slot 78 in the plate 68. Thus, it can be seen that the scraper teeth 74 and 76 are guided in their upward movement in an interference path with respect to the plate 68. As the yoke 30 moves upwardly in response to a predetermined tensile force on the belt 14 which has clamped the rollers 50, 40 and 42 on the belt, the teeth 74 and 76 scrape a series of furrows or grooves 80 in the surface of the plates 68. It is to be understood that the plate 68 is formed of a relatively soft material with respect to the scraper teeth 74 and 76.

Preferably, the plate 68 is formed of a plastic material, while the teeth 74 and 76 are formed of a low-cost steel. However, the plate 68 could be formed from a variety of relatively soft materials such as aluminum or the like.

A pair of rollers 82 and 84 supported for rotation to the sidewalls 64 of the bracket at the upper end of the bracket guide the belt 14 for movement through a slot 86 in the bracket and toward and away from the seat mounting device.

As the yoke 30 moves upwardly, the teeth 76 and 74 scrape the grooves 80 in the plate 68 so that the energy acting on the belt 14 to produce the upward movement of the yoke is absorbed in the scraping action. Furthermore, the scraping action produces a constant force in opposition to the predetermined tensile force acting on the belt so that as the belt 14 extends at a controlled rate the occupant experiences a cushioned displacement with respect to the seat. It can further be seen that the maximum length of the belt 14 that can be extended after the rollers 40, 42 and 50 have engaged in belt clamping relationship corresponds to the full upward travel of the yoke 30. At the upper end of the yoke travel the threaded fastener 67 engages the end of the slot 66 to form a rigid connection between the belt 14 and the fixed part of the vehicle 28. By utilizing an expendible energy absorbing element 68, the device can be readily disassembled to permit installation of a replacement element after a shock has been applied to the belt 14.

It can therefore be seen that we have described in detail an improved seat belt mounting device for attaching the operative portions of a seat belt to a relatively fixed portion of a vehicle and providing three operative connections between the belt and the vehicle including:

(1) A normal connection permitting relatively free, unrestrained displacement of the occupant with respect to the fixed portion of the vehicle, in response to normal occupant movements, (2) A shock absorbing connection providing restricted, controlled displacement of the occupant with respect to the fixed portion of the vehicle in response to a violent force acting to separate the occupant from his seat, and (3) A fully-restrained condition wherein further displacement of the occupant from the seat is prevented.

Although we have described but one preferred embodiment of our invention, it is to be understood that various changes and revisions can be made therein without departing from the spirit of the invention.

We claim:

1. In a vehicle having a seat assembly, the combination comprising:
    (a) a first member having a planar surface;
    (b) a second member having a series of teeth;
    (c) means fixedly mounting one of said members with respect to the seat assembly;
    (d) means movably supporting the other of said members for an energy absorbing motion with respect to said one of said members in which the teeth of the second member abrades the surface of said first member;
    (e) an elongated seat belt associated with said seat assembly; and (f) means connecting said seat belt to the movably supported of said members so that a motion of the seat belt with respect to the seat assembly moves the movably supported of said members in its energy absorbing motion.

2. The combination as defined in claim 1, in which the teeth of the second member are engaged with the surface of the first member to restrain motion of the seat belt with respect to the seat assembly until the belt is moved by a predetermined tensile force.

3. The combination as defined in claim 1, including means for limiting the distance the movable of said members travels with respect to the fixedly mounted of said members in its energy absorbing motion.

4. The combination as defined in claim 1, wherein the means mounting said first member includes a bracket having an elongated slot, and fastener means joining the second member to said bracket with its teeth engaged with the surface of the first member, said fastener means being disposed at one end of the slot prior to said energy absorbing motion and cooperating with the slot to guide the movable of said members so that the teeth cut a series of grooves in the surface of the first member parallel to said slot.

5. The combination as defined in claim 4, including retracting means supported on the movable of said members and connected to said seat belt to bias the belt in a first direction towards a stored position, said retracting means permitting a motion of the belt away from the stored position.

6. The combination as defined in claim 5, including clamping means on the movable of said members for providing a connection between the belt and the movable of said members when the belt is partially extended from said retracting means, said connection being operative so that the movable of said members moves with the belt.

7. The combination as defined in claim 6, wherein said clamping means comprises:
(a) a pair of spaced parallel rollers, each supported on the movable of said members for rotation about an axis fixed with respect to the movable of said members;
(b) a third roller mounted on the movable of said members for rotation about an axis that is substantially parallel to the axes of rotation of said pair of rollers, said third rollers being supported for motion toward and away from a first position adjacent the pair of rollers;
(c) bias means urging said third roller away from the pair of rollers to a second position in which the third roller is spaced from the pair of rollers a distance greater than the thickness of the belt, and
wherein the belt is mounted between said pair of rollers in contact with the surface of one of said pair, around a portion of the third roller, and in contact therewith, and then between said pair of rollers in contact with second of said pair, and is operative when moved between said rollers to move the third roller against the bias of said bias means to its first position in which the belt is clamped between the third roller and the pair of rollers to form a connection between the movable of said members and the belt.

8. In a vehicle having a seat assembly, the combination comprising:
(a) a bracket fixed with respect to said seat assembly, said bracket having an elongated slot;
(b) a first member having a planar surface, said first member being replaceably mounted on said bracket adjacent said slot;
(c) a yoke having a pair of spaced sidewalls connected by a base and a series of teeth fixed with respect to said base;
(d) fastener means mounting said yoke on said bracket for an energy absorbing motion with respect to the bracket in which said teeth engage the surface of said first member and move substantially parallel to said surface, said fastener means being movably engaged in said slot so that the teeth form a series of grooves in said surface parallel to said slot as the yoke is moved with respect to the bracket;
(e) a seat belt retractor supported for rotation in first and second directions on the sidewalls of the yoke;
(f) an elongated seat belt connected to said retractor and adapted to be wound thereon as the retractor rotates in its first direction and unwound therefrom as the retractor rotates in its second direction; and
(g) clamping means supported on the sidewalls of the yoke adjacent said retractor, said clamping means having a first condition in which it allows the belt to be unwound from the retractor, and its second condition in which it responds to a predetermined motion of the belt to form a connection between the belt and the yoke to move the yoke in its energy absorbing motion.

9. A seat belt mounting device as defined in claim 4, wherein said second member is releasably supported to said bracket.

10. A seat belt mounting device as defined in claim 4, wherein said bracket is mounted in the back supporting section of said seat assembly.

11. A seat belt mounting device as defined in claim 7, wherein said pair of rollers each have a flat portion extending the full length of their circumferential surfaces; the flat portion of said rollers being operative to prevent rotation of said pair of rollers when the third roller is in its first position.

References Cited

UNITED STATES PATENTS

| 3,089,564 | 5/1963 | Smittle | 297—386 X |
| 3,195,685 | 7/1965 | Blackstone | 297—386 X |
| 3,198,288 | 8/1965 | Presunka | 297—386 X |
| 3,308,908 | 3/1967 | Bunn | 297—386 X |
| 3,343,874 | 9/1967 | Hildebrandt | 297—386 |

FOREIGN PATENTS

| 752,017 | 7/1956 | Great Britain. |
| 905,836 | 9/1962 | Great Britain. |

JAMES T. McCALL, *Primary Examiner.*

U.S. Cl. X.R.

188—1; 297—385, 388